United States Patent [19]

Nunes

[11] Patent Number: 4,981,584

[45] Date of Patent: Jan. 1, 1991

[54] APPARATUS FOR DETECTING AND ELIMINATING AIR AND WATER FROM FUEL IN INTERNAL COMBUSTION ENGINES

[76] Inventor: Antonio J. Nunes, Estrada Nacional No. 9, Fervenca - 2710 Sintra, Portugal

[21] Appl. No.: 414,618

[22] Filed: Sep. 27, 1989

Related U.S. Application Data

[63] Continuation of Ser. No. 273,751, Nov. 16, 1988, abandoned, which is a continuation of Ser. No. 97,633, Sep. 16, 1987, abandoned.

[30] Foreign Application Priority Data

Sep. 16, 1986 [PT] Portugal .................................. 81330

[51] Int. Cl.[5] .............................................. B01D 35/00

[52] U.S. Cl. ...................................... 210/86; 123/516; 210/87; 210/94; 210/95; 210/180; 210/416.4

[58] Field of Search ..................... 210/86, 94, 95, 180, 210/416.4, 87; 123/516

[56] References Cited

U.S. PATENT DOCUMENTS 3,237,770 3/1966 Humbert .............................. 210/94
4,264,442 4/1981 Jackson ................................ 210/86
4,602,605 7/1986 Adkins ............................... 123/516
4,637,351 1/1987 Pakula ............................ 210/416.4

*Primary Examiner*—Peter Chin
*Attorney, Agent, or Firm*—Toren, McGeady & Associates

[57] ABSTRACT

An apparatus for detecting air and water in and eliminating air and water from the fuel in diesel-type internal combustion engines includes a main body which is composed of an upper part, a cylindrical and transparent intermediate part, and a lower base part. The upper part defines five openings of suitable diameter. The first opening is connected to a connection tube for taking in fuel from a fuel tank. The second opening receives a suction tube immersed in fuel contained in the intermediate part and in communication with an injection pump. The suction tubes defined an inlet hole at the lower level within the intermediate part which ensures that fuel is conducted to the injection pump without air. A third opening is in communication with a fuel return leakage of the injection pump. A fourth opening receives a warning probe member which includes a float sliding in a guide member. The float controls two magnetic switches by sliding in the guide. A fifth opening serves as an air outlet connected to an electromagnetic valve which, in turn, is connected to an automatic air discharge means controlled by the warning probe. The lower base body includes a means for removing water.

6 Claims, 2 Drawing Sheets

APPARATUS FOR DETECTING AND ELIMINATING AIR AND WATER FROM FUEL IN INTERNAL COMBUSTION ENGINES

This is a continuation of application Ser. No. 07/273,751, filed Nov. 16, 1988 abandoned, which in turn is a continuation of Ser. No. 07/097,633, filed Sept. 16, 1987, abandoned.

BACKGROUND OF THE INVENTION

1. Field of the Invention

The present invention relates to an apparatus for detecting air and water in and eliminating air and water from the fuel in diesel-type internal combustion engines.

2. Description of the Prior Art

It is not known in the art to automatically eliminate air and water from the fuel in diesel-type internal combustion engines.

In the past, air and water have been removed manually. This procedure must be carried out by an operator who is knowledgeable in the operation of internal combustion engines. In addition, the procedure causes delay and hygienic problems.

In systems installed in more modern vehicles, if air enters the system in small quantities, i.e., when fuel runs dry in the tank, the pump can be primed and the air eliminated by carrying out successive attempts of starting the engine. Such attempts drain the battery, damage the starter and may even cause damage to the injection system in cases of air overflow.

Moreover, if a leakage occurs in the feed system, the pump will constantly be unprimed causing successive engine stoppages, so that the operator has to perform repeated attempts at starting the engine.

It has been found that most failures occurring in internal combustion engines are due to the ingress of air into the fuel injection pump which becomes unprimed as a result.

The ingress of air may be caused by a rupture in the main fuel system, by deficient sealing members in joints, by partial obstructions in tubes or filters, by lack of fuel and also if fuel filters are replaced without the required bleeding being carried out.

In spite of substantial technical improvements made in the past in fuel injection pumps, the automatic discharge of air from fuel systems is not yet known. Accordingly, it cannot be avoided that a pump becomes unprimed when a mechanical or electrical fuel pump delivers fuel mixed with air and pumps this mixture to the fuel injection pump.

It is, therefore, the primary object of the present invention to provide an automatically operated apparatus for detecting air and water in and eliminating air and water from the fuel in internal combustion engines. Thus, the problems resulting from the unpriming of a fuel injection pump in diesel-type internal combustion engines when air is mixed into the fuel are to be avoided.

SUMMARY OF THE INVENTION

In accordance with the present invention, the apparatus of the type described above includes a main body which is composed of an upper part, a cylindrical and transparent intermediate part, and a lower base part. The upper part defines five openings of suitable diameter. The first opening is connected to a connection tube for taking in fuel from the fuel tank. A second hole receives a suction tube immersed in fuel contained in the intermediate part and in communication with the injection pump. The suction tube defines an inlet hole at the level within the intermediate part which ensures that fuel is conducted to the injection pump without air. A third opening is in communication with the fuel back or return leakage or overflow of the injection pump. A fourth hole receives a warning probe member. The warning probe member includes a float which slides in a guide member. In case of failure, the float controls two magnetic switches by sliding in the guide. A fifth opening serves as an air outlet connected to an electromagnetic valve which, in turn, is connected to an automatic air discharge means controlled by the warning probe. The lower base body includes a means for removing the water.

The various features of novelty which characterize the invention are pointed out with particularity in the claims annexed to and forming a part of this disclosure. For a better understanding of the invention, its operating advantages and specific objects attained by its use, reference should be had to the drawings and descriptive matter in which there is illustrated and described a preferred embodiment of the invention.

DETAILED DESCRIPTION OF THE INVENTION

Figure 1:
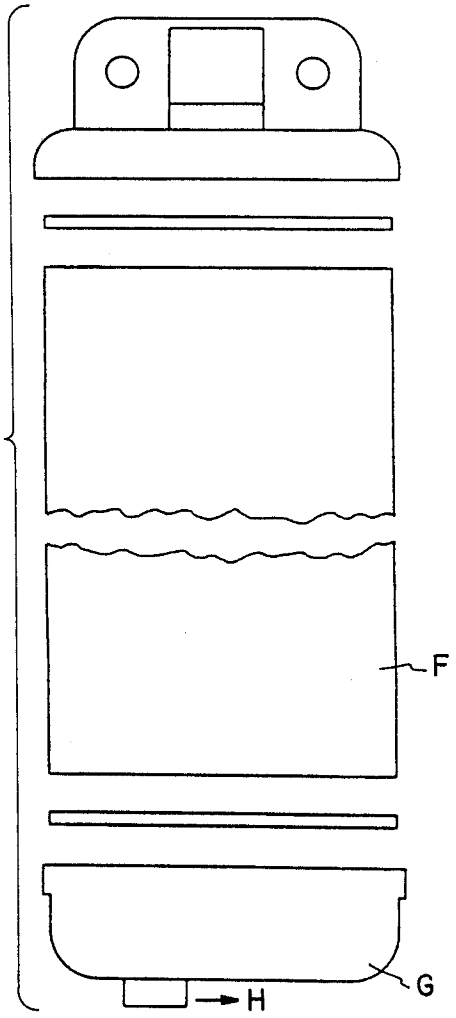
FIG. 1 is an exploded side view of an apparatus according to the present invention.
Figure 2:
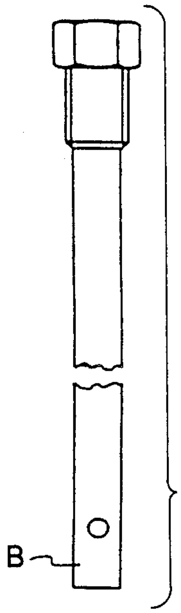
FIG. 2 is a side view of a suction hose of the apparatus of FIG. 1.
Figure 3:
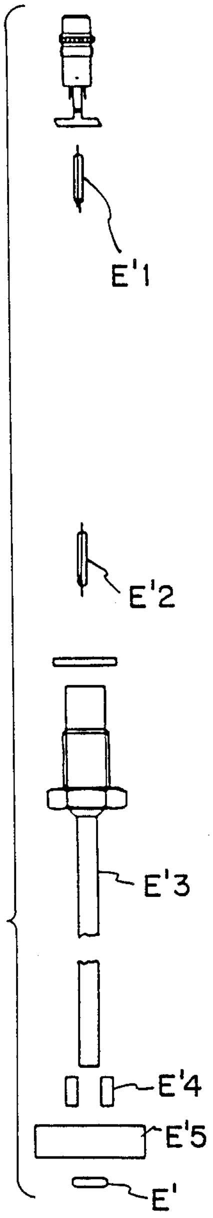
FIG. 3 is an exploded view of a warning probe of the apparatus of FIG. 1.
Figure 4:
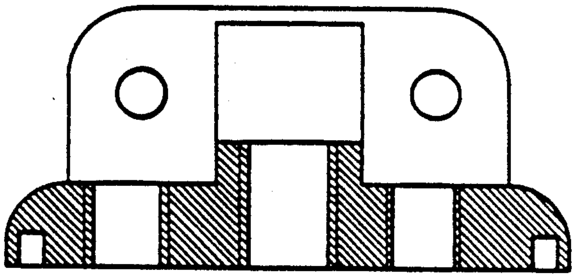
FIG. 4 is a side view of the upper part of the apparatus according to the present invention.

As illustrated in the drawing, the apparatus according to the present invention is essentially composed of an upper part I, an intermediate part F and a lower base part G.

The upper part I defines five cylindrical openings which serve the following purposes.

Figure 5:
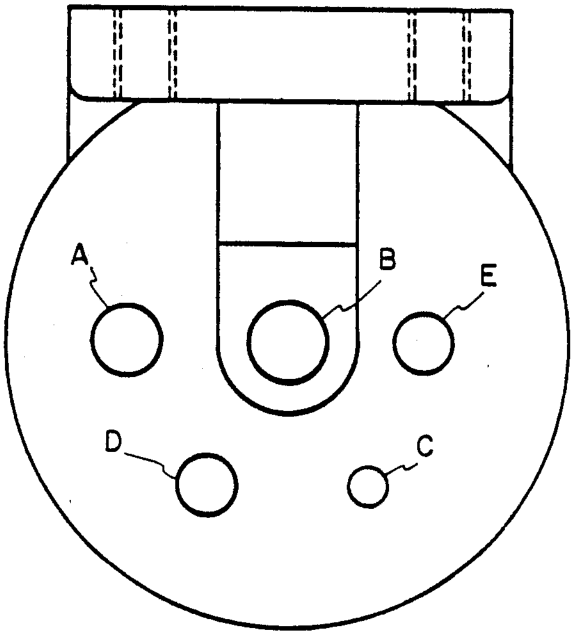
FIG. 5 is a transverse sectional view of the part shown is FIG. 4.

Referring to FIG. 5, opening A serves as an inlet of fuel through a connection tube. Opening B receives a suction hose provided with holes B′ through which the fuel is supplied to the injection pump. Opening C receives an electromagnetic valve for discharging air. Opening D serves as an inlet of the back leakage of a fuel injection pump, not shown. Opening E receives a warning probe generally denoted by reference character E′.

The warning probe E′ includes a float E′5 which slides within a guide member E′3 and incorporates magnets E′4 which, in operation, are to be properly calibrated and balanced. When the float reaches a certain level, it actuates a magnetic switch E′1 which, in turn, actuates an electronic circuit controlling the electromagnetic valve for the air discharge through opening C. When the fuel and, thus, the float, drops within the apparatus to a critical level, the float actuates another magnetic switch E′2 which is connected to the electronic circuit and, in systems including solenoid valve control, causes an interruption of the electric current to the injection pump and, at the same time, actuates a warning lamp or some other type of alarm. In systems without solenoid valves, the electronic circuit merely actuates a warning lamp or some other type of alarm. Instead of using a warning probe with a float, an electronic means for detecting the fuel levels can be used.

The intermediate body F may be cylindrical and of transparent material. The warning probe E' and the suction tube mentioned above extend into this intermediate body. During normal operation, the intermediate body F is completely filled with fuel.

The lower base part G defines a hole in which an automatic or non-automatic means for removing water and other impurities is installed. The body G may further include an electronic system for detecting and automatically eliminating the water which can sometimes be found in fuel. The removal of water and other impurities is schematically denoted by an arrow and reference character H in FIG. 1.

Without altering the scope of the present invention, to the lower base part may be connected a horizontally or vertically extending suction hose for discharging the fuel to the injection pump, replacing opening B in the upper part.

In operation, the apparatus according to the present invention is placed between a secondary fuel filter and the injection pump. Preferably, the apparatus is placed at a higher level than the injection pump. However, it is also possible to place the apparatus at the same level or even at a lower level than the injection pump, specifically in the case of a rotary distributing pump.

Fuel is introduced into the apparatus through opening A in the upper part I under pressure generated by a mechanical or electric pump. The fuel leaves the apparatus through opening cap B to the injection pump through a suction hose B' which, for this purpose, is equipped with holes provided at a certain level. Optionally, the fuel may be conducted out of the apparatus through a horizontally or vertically extending suction hose mounted in the lower base part.

Instead of being connected to the fuel tank, the back leakage or overflow tube of the injection pump is connected to the apparatus through opening D.

During normal operating conditions of the engine feeding system, the apparatus according to the present invention is not in use.

However, if air enters the fuel system, for example, caused by a small rupture in the circuit between the fuel tank and the mechanical or electrical pump, the injection pump becomes unprimed leading to a stoppage of the engine.

In this situation, the apparatus according to the present invention operates as follows:

Air occupies the upper part of the apparatus and fuel without air is pumped to the fuel injection pump through suction tube B' whose inlet openings are at a lower level within the intermediate part of the apparatus.

When the fuel drops to a certain level and the warning probe float drops accordingly, the float actuates a magnetic switch, which, in turn, closes an electronic circuit which actuates the electromagnetic valve in opening C. The outlet of this valve is now connected to the back leakage tube of the tank, so that some fuel, drawn in by air, may be lead to the tank. When air is discharged, fuel rises in the apparatus because the mechanical or electric pump has a substantially higher output than the engine consumes.

In addition, the electronic system causes a warning lamp to be switched on or off as the fuel level goes up or down within the apparatus so as to indicate any anomaly.

If the amount of air introduced is such that the engine consumes more fuel than is conducted into the apparatus, the warning light will remain switched on and will indicate that the lack of fuel is increasing and the engine will soon stop. Once the critical level is reached, the float actuates a magnetic switch which is connected to the electronic circuit which switches off the electric current to the injection pump and/or maintains on a warning lamp or some other type of alarm.

Accordingly, even when the engine stops for lack of feed, the pump does not become unprimed, and so any person can easily eliminate the problem, since the cause of the problem is clearly apparent.

While a specific embodiment of the invention has been shown and described in detail to illustrate the application of the inventive principles, it will be understood that the invention may be embodied otherwise without departing from such principles.

I claim:

1. An apparatus for detecting air and water in and eliminating air and water from fuel in diesel-type internal combustion engines, comprising a chamber defined by a tubular casing having an upper solid end part and a lower solid end part sealingly engaged therewith, the upper end part having first to fifth openings, the first opening being connected to a connection tube for taking in fuel from a fuel tank, the second opening receiving a suction tube disposed in and immersed in fuel contained in the tubular casing and in communication with an injection pump, the suction tube defining an inlet hole positioned at a lower level within the tubular casing such that fuel is conducted to the injection pump without air, the third opening being in communication with a fuel return leakage of the injection pump, the fourth opening receiving a warning probe member which includes a float sliding in a guide member, the float and the guide member being axially disposed in the chamber, the float having means for activating a first and a second magnetic switch positioned at an upper and a lower portion of the warning probe respectively, the first switch and the second switch connected to an electronic circuit, the electronic circuit comprising means for activating an electromagnetic valve in communication with the fifth opening for discharging air through the fifth opening when the first switch is activated, the second switch connected to the electronic circuit, the electronic circuit further comprising means for activating the injection pump when the second switch is activated, the lower end part including a means for removing water.

2. The apparatus according to claim 1, wherein the tubular casing is cylindrical and transparent.

3. An apparatus for detecting air and water in and eliminating air and water from fuel in diesel-type internal combustion engines, comprising a chamber defined by a tubular casing having an upper solid end part and a lower solid end part sealingly engaged therewith, the lower end part including means for removing water and having an opening receiving a suction tube disposed and immersed in fuel contained in the tubular casing and in communication with an injection pump, the suction tube having an inlet hole at the lower level within the tubular casing such that fuel is conducted to the injection pump without air, the upper end part having first through fourth openings, the first opening being connected to a connection tube for taking in fuel from a fuel tank, the second opening being in communication with a fuel tank return leakage of the injection pump, the third opening receiving a warning probe member including a float sliding in a guide member, the float and the guide member being axially disposed in the chamber, the float having means for activating a first and a second magnetic switch, the first switch and the second switch connected to an electronic circuit, the electronic circuit comprising means for controlling an electromagnetic valve in communication with the fourth opening for discharging air through the fourth opening when the first switch is activated, the second switch connected to an electronic circuit, the second electronic circuit comprising means for activating the injection pump when the second switch is activated.

4. The apparatus according to claim 3, wherein the tubular casing is cylindrical and transparent.

5. The apparatus according to claim 3, wherein the opening in the lower part extends vertically.

6. The apparatus according to claim 3, wherein the opening in the lower part extends horizontally.

* * * * *